United States Patent [19]

Asanuma

[11] Patent Number: 5,200,439
[45] Date of Patent: Apr. 6, 1993

[54] METHOD FOR INCREASING INTRINSIC VISCOSITY OF SYNDIOTACTIC POLYPROPYLENE

[75] Inventor: Tadashi Asanuma, Takaishi, Japan

[73] Assignee: Mitsui Toatsu Chemicals, Inc., Tokyo, Japan

[21] Appl. No.: 679,533

[22] Filed: Apr. 2, 1991

[30] Foreign Application Priority Data

Apr. 13, 1990 [JP] Japan .................................. 2-96546
May 30, 1990 [JP] Japan .................................. 2-138252
Nov. 29, 1990 [JP] Japan .................................. 2-325514

[51] Int. Cl.$^5$ .................. C08F 2/48; C08F 110/06; C08J 3/28
[52] U.S. Cl. .................................. 522/157; 522/161; 526/351
[58] Field of Search .................. 522/157, 161; 526/351

[56] References Cited

U.S. PATENT DOCUMENTS

| | | | |
|---|---|---|---|
| 3,258,455 | 6/1966 | Natta et al. | 526/159 |
| 3,305,538 | 2/1967 | Natta et al. | 526/351 |
| 4,335,225 | 6/1982 | Collette et al. | 526/154 |
| 4,892,851 | 1/1990 | Ewen et al. | 526/160 |
| 4,916,198 | 4/1990 | Scheve et al. | 526/351 |
| 5,047,446 | 9/1991 | DeNicola et al. | 526/351 |

FOREIGN PATENT DOCUMENTS

| | | | |
|---|---|---|---|
| 0190889 | 8/1986 | European Pat. Off. | 522/157 |
| 0351392 | 1/1990 | European Pat. Off. | |
| 0351866 | 1/1990 | European Pat. Off. | |
| 1145326 | 10/1957 | France | |
| 62-121704 | 6/1987 | Japan | |
| 2-69533 | 3/1990 | Japan | |
| 2292311 | 12/1990 | Japan | 526/351 |
| 3000709 | 1/1991 | Japan | 526/351 |
| 0831914 | 4/1960 | United Kingdom | 522/157 |
| 84/01156 | 3/1984 | World Int. Prop. O. | |

OTHER PUBLICATIONS

Journal of Applied Polymer Sicentce, vol. 11, pp. 705-718 (1967).

*Primary Examiner*—Marion E. McCamish
*Assistant Examiner*—Susan Berman
*Attorney, Agent, or Firm*—Burns, Doane, Swecker & Mathis

[57] ABSTRACT

A method for increasing the intrinsic viscosity of polypropylene having a substantially syndiotactic structure is disclosed which comprises the step of irradiating the syndiotactic polypropylene with radiation in the absence of oxygen. After the irradiation, the polypropylene is preferably heated. Furthermore, the polypropylene having the substantially syndiotactic structure which remains in a melting state can be irradiated with radiation. The polypropylene having the substantially syndiotactic structure is preferably polypropylene in which any diffraction line is not substantially observed in a spacing of about 7.1 Å by X-ray diffraction.

18 Claims, 2 Drawing Sheets

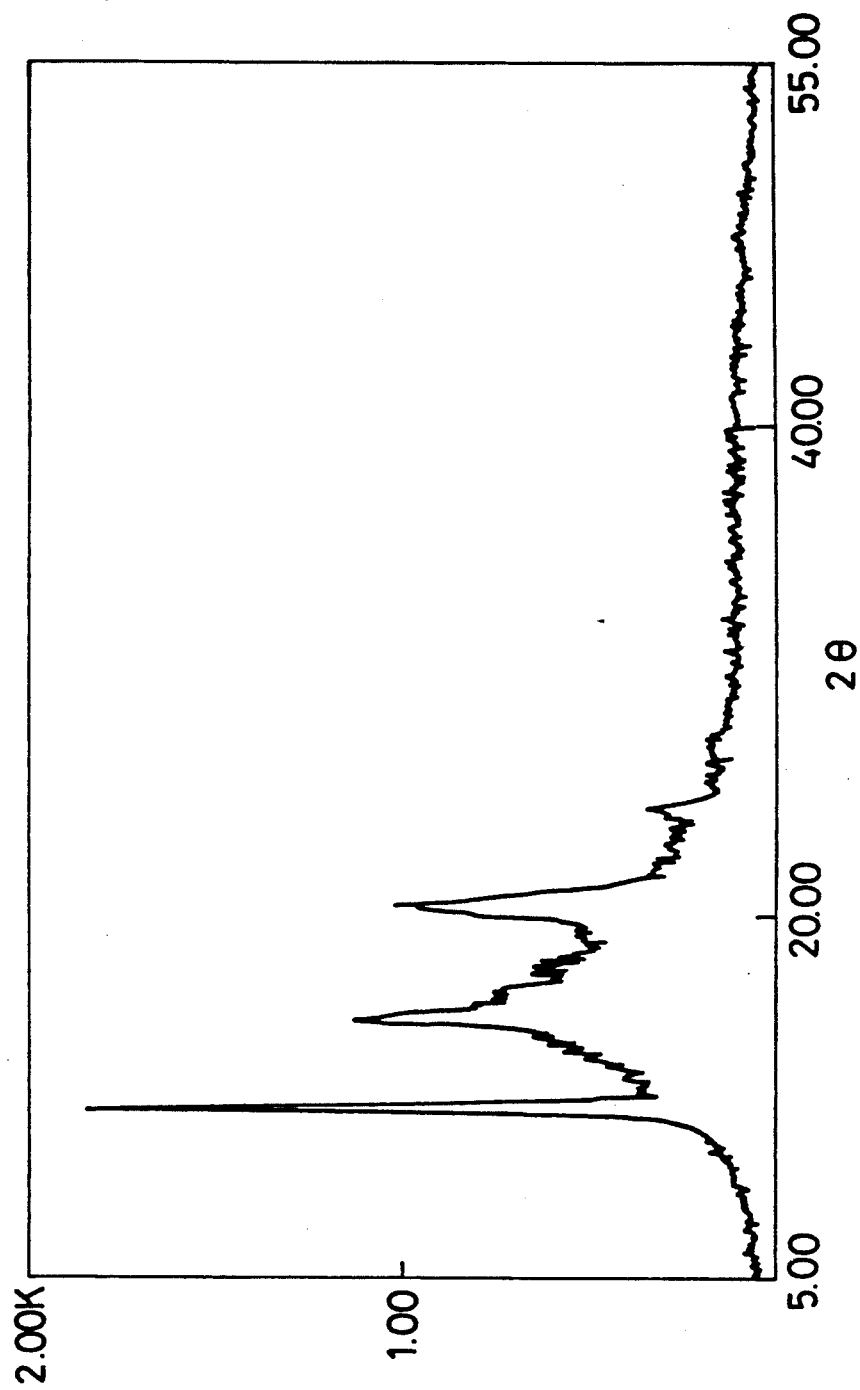

METHOD FOR INCREASING INTRINSIC VISCOSITY OF SYNDIOTACTIC POLYPROPYLENE

BACKGROUND OF THE INVENTION (a) Field of the Invention

The present invention relates to a method for increasing the molecular weight of polypropylene having a syndiotactic structure. More specifically, it relates to a method for increasing the molecular weight of polypropylene having a substantially syndiotactic structure by partially crosslinking the polypropylene.

(b) Description of the Prior Art

Isotactic polypropylene is utilized in various applications, because of being inexpensive and because of having the relatively good balance of physical properties. On the other hand, syndiotactic polypropylene has been known for a long period of time. However, the syndiotactic polypropylene prepared by polymerization at a low temperature in the presence of a conventional catalyst comprising a vanadium compound, an ether and an organic aluminum compound was poor in syndiotacticity and had elastomer-like characteristics. Therefore, it was scarcely considered to have characteristic properties as syndiotactic polypropylene.

On the contrary, syndiotactic polypropylene having good tacticity, i.e., a syndiotactic pentad fraction of more than 0.7 has been discovered for the first time by J. A. Ewen et al. which can be obtained by the use of a catalyst comprising a transition metal compound having an asymmetric ligand and an aluminoxane (J. Am. Chem. Soc., Vol. 110, p. 6255–6256, 1988). This syndiotactic polypropylene having a good steric regularity is excellent in balance between stiffness and impact resistance and therefore it is also sufficiently utilizable in the applications of the conventional isotactic polypropylenes. However, the above-mentioned catalyst has the problem that it can only provide polymers having a small molecular weight and a narrow molecular weight distribution and the other problem that it gives a poor moldability.

In order to solve these problems, it is useful to expand the molecular weight distribution, and this expansion of the molecular weight can be achieved to some extent by the use of a mixture of catalysts comprising different transition metals. However, in this case, there is the problem that the activity of the catalysts is poor.

Furthermore, when isotactic polypropylene is irradiated with radiation, the crosslinked and branched polymer can be obtained which is excellent in moldability (EP 190889 and EP 351866). When isotactic polypropylene is irradiated with radiation, however, its molecular weight decreases rapidly. Thus, it has not been considered that the molecular weight increases by a small dose, e.g., several Mrad of radiation [e.g., Journal of Applied Polymer Science, Vol. 11, p. 705 (1967)].

SUMMARY OF THE INVENTION

In such a situation, an object of the present invention is to provide a method for easily increasing the molecular weight of polypropylene having a substantially syndiotactic structure by the utilization of a small dose of radiation.

The present inventor has intensively researched a technique for increasing the molecular weight of polypropylene having a substantially syndiotactic structure so as to achieve the above-mentioned object, and in consequence, the present invention has been completed.

The present invention is directed to a method for increasing the molecular weight of polypropylene having a substantially syndiotactic structure which comprises the step of irradiating the syndiotactic polypropylene with radiation in the absence of oxygen.

In the present invention, the polypropylene having the substantially syndiotactic structure include a homopolymer of propylene having a syndiotactic structure and a copolymer of propylene and another olefin having a syndiotactic structure.

BRIEF DESCRIPTION OF THE DRAWINGS

FIG. 2 shows an X-ray diffraction spectrum of a molded syndiotactic propylene article in Example 3.

DESCRIPTION OF THE PREFERRED EMBODIMENT

Figure 1:
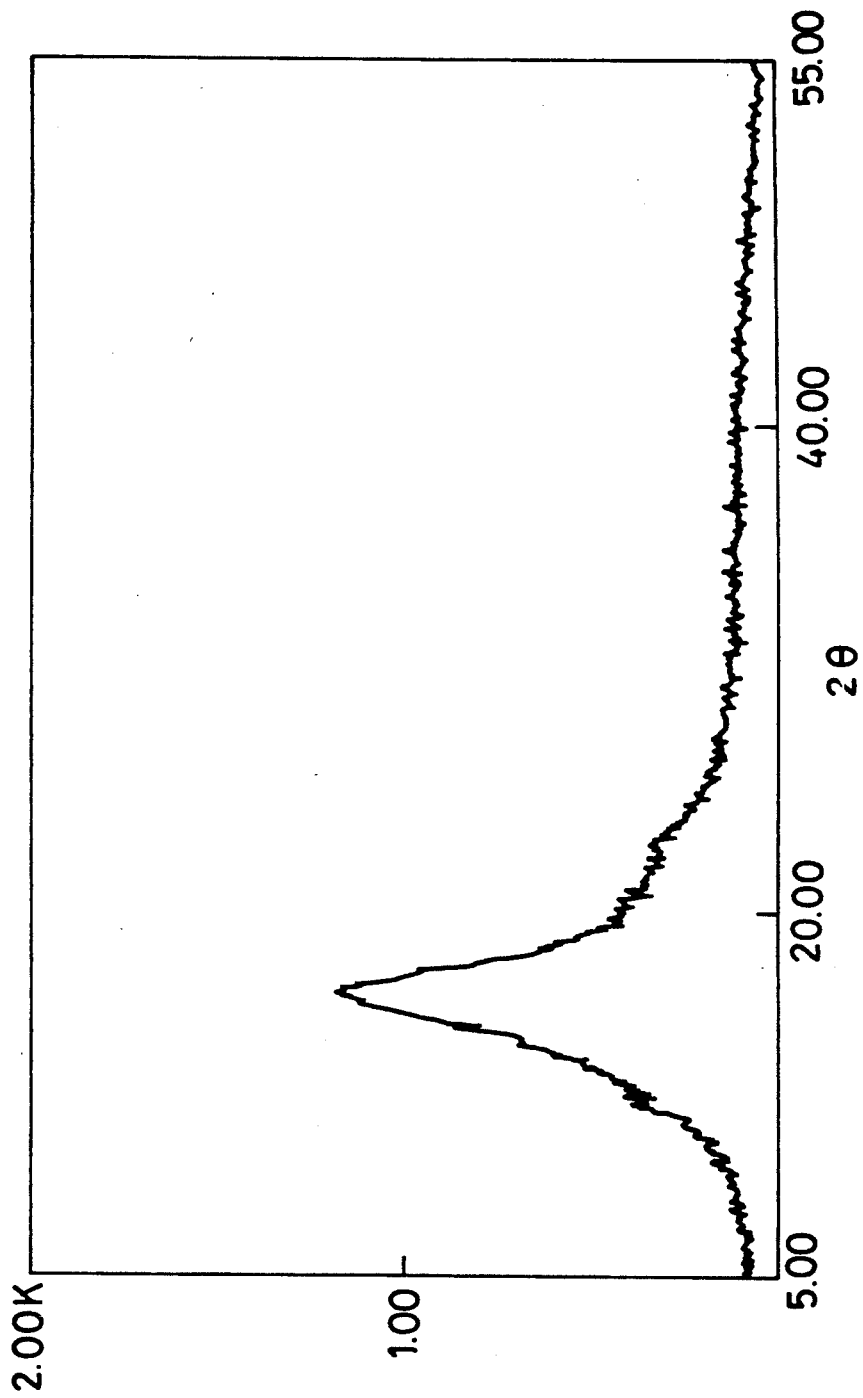
FIG. 1 shows an X-ray diffraction spectrum of a molded syndiotactic propylene article in Example 2.

As catalysts for the manufacture of syndiotactic polypropylene, there can be exemplified catalysts each comprising a transition metal compound having an asymmetric ligand and an aluminoxane which are described in the above-mentioned J. A. Ewen et al. literature. In addition, other catalysts having different structures can also be used, as long as they can provide polypropylene having a syndiotactic pentad fraction of 0.7 or more as a result of polymerization of propylene alone.

Examples of the transition metal compound having the asymmetric ligand include isopropyl(cyclopentadienyl-1-fluorenyl)hafnium dichloride and isopropyl(cyclopenta-dienyl-1-fluorenyl)zirconium dichloride which are mentioned in the above-mentioned literature. In addition, examples of the aluminoxane include compounds represented by the formula (I) and (II)

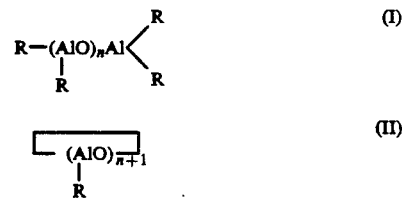

(wherein R is a hydrocarbon residue having 1 to 3 carbon atoms, and n is an integer of from 1 to 50). In particular, what is suitably used in the present invention is the aluminoxane in which R is methylalumoxane and n is 5 or more, preferably 10 or more.

The amount of the aluminoxane to be used is from 10 to 1,000,000 mole times, usually from 50 to 5,000 mole times as much as that of the transition metal compound.

No particular restriction is put on polymerization conditions, and various polymerization techniques are utilizable such as solvent polymerization using an inert solvent, bulk polymerization in which there is substantially no inert solvent, and gas phase polymerization. Usually, the polymerization temperature is from $-100°$ to $200°$ C. and the polymerization pressure is from atmospheric pressure to 100 kg/cm$^2$. Preferably, the temperature is from $-100°$ to $100°$ C. and the pressure is from atmospheric pressure to 50 kg/cm$^2$.

The preferable molecular weight of the polypropylene having the substantially syndiotactic structure to be irradiated with radiation in the present invention is usually such that its intrinsic viscosity measured in a tetralin solution at 135° C. is from about 0.1 to about 5, particularly 2.0 or less.

In the case of the propylene homopolymer, its syndiotacticity is 0.6 or more, preferably 0.7 or more in terms of a syndiotactic pentad fraction. When the syndiotactic pentad fraction is less than 0.6, characteristics of the crystalline polypropylene are poor and physical properties are also unpreferably bad. Furthermore, in the case of a copolymer of propylene and another olefin, this copolymer is characterized in that in its $^{13}$C-NMR absorption spectrum measured in a 1,2,4-trichlorobenzene solution on the basis of tetramethylsilane, a peak intensity observed at about 20.2 ppm is 0.3 or more, preferably 0.5 or more of a peak intensity attributed to all the methyl groups of propylene units. When this value is less than 0.3, physical properties are unpreferably poor.

Examples of the olefin other than propylene which can be used in the copolymerization with propylene include ethylene and α-olefins having 4 to 20 carbon atoms which may be branched. The particularly preferable examples are butene-1, pentene-1, hexene-1, octene-1 and 4-methylpentene-1. The amount of the olefin is 20% by weight or less, preferably 10% by weight or less based on the weight of propylene.

In the present invention, syndiotactic polypropylene can be irradiated with radiation in the absence of oxygen, i.e., in vacuo or under an atmosphere of an inert gas such as nitrogen, helium or argon. When radicals are present even after the irradiation, it is preferred that the syndiotactic polypropylene which has been irradiated with the radiation is maintained in the oxygen-free atmosphere for a period of time enough to allow the radicals to disappear.

Examples of the radiation include gamma-rays, electron beams, X-rays and accelerated ions, and above all, the gamma-rays and X-rays having a high transmission can be preferably utilized. When the electron beams are used, syndiotactic polypropylene having a small thickness is preferably used in the irradiation step. The dose of the radiation is from 0.1 to 50 Mrad, usually 1 to 10 Mrad.

The irradiation of the gamma-rays and electron beams is industrially practiced. In the case of the gamma-rays, a batch system is employed because the irradiation of the gamma-rays usually takes a long period of time, but in the case of the electron beams, the polymer can be put on a conveyor disposed under an electron beam irradiating device and then irradiated with the electron beams.

In the present invention, the polymer is irradiated with the radiation at a relatively low temperature, preferably 100° C. or less, particularly preferably 50° C. or less under such conditions that radicals remain in the polymer after the irradiation, and after this irradiation, heating is preferably carried out.

A heating temperature is preferably higher than the irradiation temperature but lower than the melting point of syndiotactic polypropylene, and it is usually from 80° to 140° C.

A heating time depends upon the above-mentioned heating temperature, and the high heating temperature makes the heating time short. Usually, the heating time is from about 5 minutes to about 5 hours. The heating temperature and heating time are such as to allow the radicals to disappear. For example, this purpose can be achieved by heating the polymer at 100° C. for 1 hour.

The heating treatment subsequent to the irradiation can inhibit the molecular weight decrease of polypropylene which occurs in the case that the syndiotactic polypropylene having the radicals is handled in the presence of oxygen.

In the present invention, it is preferred that the syndiotactic polypropylene to be irradiated with radiation in the absence of oxygen has a low crystallinity. Here, "the syndiotactic polypropylene having a low crystallinity" means the syndiotactic polypropylene in which any diffraction line is not substantially observed in a spacing of about 7.1 Å by X-ray diffraction. Moreover, "the diffraction line is not substantially observed" means that the diffraction line is about 1/5 or less of the maximum peak intensity of an observed diffraction image, when the measurement is made in the 2θ range of from 5° to 50° by the use of Cu-K α rays which is the X rays.

In the syndiotactic polypropylene in which the intensive diffraction line is observed in a spacing of about 7.1 Å, the increase effect of the molecular weight is imperceptible.

In a preferable embodiment, the above-mentioned syndiotactic polypropylene having the low crystallinity is irradiated with radiation preferably at an irradiation temperature of 80° C. or lower, more preferably 50° C. or lower, particularly preferably 30° C. or lower under such conditions that the radicals sufficiently remain in the syndiotactic polypropylene after the irradiation, followed by a heating treatment. In this heating treatment, the above-mentioned heating temperature can be employed. It should be noted that even if the crystallinity of syndiotactic polypropylene is high, its molecular weight can increase by the irradiation, but if it is low, the increase of the molecular weight can be accomplished effectively.

In the present invention, it is also a preferable embodiment that syndiotactic polypropylene in a melting state is irradiated with radiation in the absence of oxygen. Here, "the melting state" means that the syndiotactic polypropylene is not in a substantially crystalline state, i.e., that any sharp peak attributed to a crystalline structure is not observed when an X-ray diffraction spectrum is measured.

A temperature in the irradiation step should be such as to sufficiently delay a crystallization rate of the melted syndiotactic propylene, but it is not necessary to maintain this temperature at the melting point of the syndiotactic polypropylene or higher. The usable temperature is preferably from 300° to 60° C., particularly preferably from 180° to 80° C.

When the irradiation is conducted in the melting state, syndiotactic polypropylene can be molded without heating or without cooling after the irradiation. In such an embodiment, the radicals present in the melted syndiotactic polypropylene are not reacted with oxygen, resulting in preventing its molecular weight from decreasing.

The present invention will be described in detail in reference to examples and comparative examples. However, it should not be construed that these examples restrict the present invention.

EXAMPLE 1

In a 200-liter autoclave were placed 0.2 g of isopropyl(cyclopentadienyl-1-fluorenyl)zirconium dichloride, 30 g of methylaluminoxane (polymerization degree 16.1) made by Toso Akzo Co., Ltd. and propylene. This isopropyl(cyclopentadienyl-1-fluorenyl)zirconium dichloride was obtained by introducing lithium into isopropylcyclopentadienyl-1-fluorene synthesized in an ordinary manner, reacting the same with zirconium tetrachloride, and then recrystallizing the resultant reaction product. Afterward, propylene was polymerized at 20° C. under a polymerization pressure of 3 kg/cm$^2$-G for 2 hours. The resultant polymer mixture was then treated at 30° C. by adding methanol and methyl acetoacetate thereto, and then washed with an aqueous hydrochloric acid solution. Next, the washed mixture was filtered to obtain 5.6 kg of a syndiotactic polypropylene. According to a $^{13}$C-NMR analysis, the syndiotactic pentad fraction of this polypropylene was 0.935, and an intrinsic viscosity (hereinafter referred to simply as "$\eta$") measured in a tetralin solution at 135° C. was 1.45. Furthermore, a ratio of the weight average molecular weight to the number average molecular weight of the polymer (hereinafter referred to simply as "MW/MN") measured in 1,2,4-trichlorobenzene was 2.2.

Afterward, a glass tube was filled with this polypropylene while being deaerated, and the polypropylene was then irradiated with 3 Mrad of gamma rays at 2 Mrad/hr, followed by heating at 100° C. for 1 hour. After the heating, $\eta$ and MW/MN of the resultant powder were 1.58 and 3.1, respectively.

Before the irradiation, the polypropylene had a die swelling of 1.19° at 23° C. at a shear rate of 100 mm/sec, and a melt tension of 12.5 g at 230° C. at a shear rate of 6 mm/sec at a take-off speed of 8.2 mm/sec.

Furthermore, after the irradiation, the polypropylene had a die swelling of 1.60 and a melt tension of 16.5 g under the same conditions as above. These values were much higher than before the irradiation, and they indicated that the irradiated polypropylene was remarkably improved.

COMPARATIVE EXAMPLE 1

The same procedure as in Example 1 was effected except that any heating treatment was not given after the irradiation, and the glass tube was then broken and measurements were made. As a result, $\eta$ was 1.38 and MW/MN was 2.12.

COMPARATIVE EXAMPLE 2

The same procedure as in Example 1 was effected except that the irradiation of gamma rays was carried out in the air. In this case, $\eta$ was 1.18 and MW/MN was 2.1.

EXAMPLE 2

The polypropylene obtained in Example 1 was melted and pressed at 200° C. to form a sheet having a thickness of 1 mm, and this sheet was then thrown into water at 0° C. to quench it. At this time, a temperature drop rate was measured by a sensor inserted in the center of the sheet, and it was 250° C./min. The X-ray diffraction spectrum of a molded article is shown in FIG. 1. Any diffraction line was not observed in a spacing of 7.1 Å ($2\theta = 12.5°$). Afterward, this sheet was placed in a glass tube under deaeration and then irradiated with 3 Mrad of gamma rays at 2 Mrad/hr at 20° C. Next, the sheet was taken out from the glass tube, and measurements were then made. As a result, $\eta$ and MW/MN of the sheet were 1.53 and 2.9, respectively. Next, a part of the sheet was heated at 100° C. for 1 hour. After this heating, $\eta$ and MW/MN of the polypropylene were 1.64 and 3.5, respectively. Under the same conditions as in Example 1, a die swelling was 1.75 and a melt tension was 17.6 g.

EXAMPLE 3

The same procedure as in Example 1 was effected except using a sheet (whose X-ray diffraction spectrum is shown in FIG. 2) obtained by cooling the polypropylene for 30 minutes after a molding step. When thermally treated after the irradiation, the polypropylene sheet had $\eta$ of 1.47. Under the same conditions as in Example 1, the die swelling of the sheet was 1.50.

COMPARATIVE EXAMPLE 3

The same procedure as in Example 1 was effected except that the irradiation of gamma rays was carried out in the air. In the case that any heating was not given after the irradiation, $\eta$ was 1.27, and in the case that the heating was given, $\eta$ was 1.29.

EXAMPLE 4

The sheet obtained in Example 2 was irradiated with 5 Mrad of electron beams under a nitrogen gas flow by the use of an electron beam irradiating device (EPS 750 made by Nisshin High Voltage Co., Ltd.). After the irradiation, the sheet was heated at 100° C. for 1 hour.

After the heating, $\eta$ was 1.84. Under the same conditions as in Example 1, a die swelling was 2.08 and a melt tension was 18.2 g.

EXAMPLE 5

The polypropylene obtained in Example 1 was placed in a glass tube, and this tube was then heated up to 230° C. under deaeration and then irradiated with 6 Mrad of gamma rays at 2 Mrad/hr at 140° C. After the irradiation, the tube was cooled, and the polypropylene was then taken out therefrom. According to measurements, $\eta$ was 1.67, and MW/MN was 4.2. In addition, according to the X-ray diffraction spectrum of the polypropylene article which was molded under the same conditions as in Example 1, any sharp peak was not observed, and broad diffraction spectra were only perceived.

COMPARATIVE EXAMPLE 4

The same procedure as in Example 1 was effected except that the irradiation of gamma rays was carried out in the air. In this case, $\eta$ was 0.85.

EXAMPLE 6

The same procedure as in Example 1 was effected except that the irradiation of gamma rays was carried out at 160° C. which was higher than the melting point of the polymer. In this case, $\eta$ was 1.69, and MW/MN was 4.6.

COMPARATIVE EXAMPLE 5

A commercially available isotactic polypropylene having an isotactic pentad fraction of 0.940, $\eta$ of 1.43 and MW/MN of 5.8 was irradiated with gamma rays in accordance with the same procedure as in Example 1. In this case, $\eta$ was 1.08.

COMPARATIVE EXAMPLE 6

Polymerization was performed at 0° C. in the same manner as in Example 1 except that isopropyl(cyclopentadienyl-1-fluorenyl)zirconium dichloride of a transition metal catalyst component was replaced with 1,2-ethylenebis(tetrahydroindenyl)zirconium dichloride, and an isotactic polypropylene having an isotactic pentad fraction of 0.895, η of 1.23 and MW/MN of 2.2 was irradiated with gamma rays in accordance with the same procedure as in Example 1. In this case, η was 0.98.

As is apparent from the aforesaid results, the molecular weight of polypropylene having a substantially syndiotactic structure can increase with ease, when the polypropylene is irradiated with radiation in the absence of oxygen and successively heated, if desired. Furthermore, the obtained polymer can have a high die swelling and melt tension and convenient characteristics which permit improving blow moldability and workability in molding sheets, films and the like.

What is claimed is:

1. A method for increasing the intrinsic viscosity of polypropylene having a substantially syndiotactic structure which comprises irradiating syndiotactic propylene having an intrinsic viscosity of from 0.1 to 5 with radiation in the absence of oxygen, and then heating the irradiated syndiotactic polypropylene until radicals formed by the irradiation disappear.

2. The method according to claim 1 wherein the polypropylene having the substantially syndiotactic structure has a syndiotactic pentad fraction of 0.6 or more.

3. The method according to claim 1 wherein the polypropylene having the substantially syndiotactic structure is a copolymer of propylene and an olefin other than propylene in which in its $^{13}$C-NMR absorption spectrum measured in a 1,2,4-trichlorobenzene solution on the basis of tetramethylsilane, a peak intensity observed at about 20.2 ppm is 0.3 or more of a peak intensity attributed to all the methyl groups of the propylene units.

4. The method according to claim 1 wherein the syndiotactic polypropylene has an intrinsic viscosity of from 0.1 to 2.0.

5. The method according to claim 1 wherein the dose of the radiation is from 0.1 to 50 Mrad.

6. The method according to claim 1 wherein the dose of the radiation is from 1 to 10 Mrad.

7. The method according to claim 1 wherein the irradiation is carried out at a temperature of 100° C. or less.

8. The method according to claim 1 wherein after the irradiation the polypropylene is heated at a temperature which is higher than the temperature at the time of the irradiation but lower than the melting point of the polypropylene.

9. The method according to claim 8 wherein the heating temperature is in the range of from 80° to 140° C.

10. The method according to claim 1 wherein the polypropylene having the substantially syndiotactic structure is a polypropylene in which a diffraction line is not substantially observed in a spacing of about 7.1 Å by X-ray diffraction.

11. The method according to claim 10 wherein the irradiation is carried out at 30° C. or less, followed by heating.

12. A method for increasing the intrinsic viscosity of polypropylene having a substantially syndiotactic structure which comprises melting syndiotactic polypropylene having an intrinsic viscosity of from 0.1 to 5, and then irradiating the melted propylene with radiation while in a liquid state.

13. The method according to claim 12 wherein the melted polypropylene is irradiated at a temperature of form 60° to 300° C.

14. The method according to claim 12 wherein the polypropylene having the substantially syndiotactic structure has a syndiotactic pentad fraction of 0.6 or more.

15. The method according to claim 12 wherein the polypropylene having the substantially syndiotactic structure is a copolymer of propylene and an olefin other than propylene in which in the $^{13}$C-NMR absorption spectrum, measured in a 1,2,4-trichlorobenzene solution on the basis of tetramethylsilane, a peak intensity observed at about 20.2 ppm is 0.3 or more of a peak intensity attributed to all the methyl groups of the propylene units.

16. The method according to claim 12 wherein the syndiotactic polypropylene has an intrinsic viscosity of from 0.1 to 2.0.

17. The method according to claim 12 wherein the dose of the radiation is from 0.1 to 50 Mrad.

18. The method according to claim 12 wherein the dose of the radiation is from 1 to 10 Mrad.

* * * * *